Patented Feb. 12, 1929.

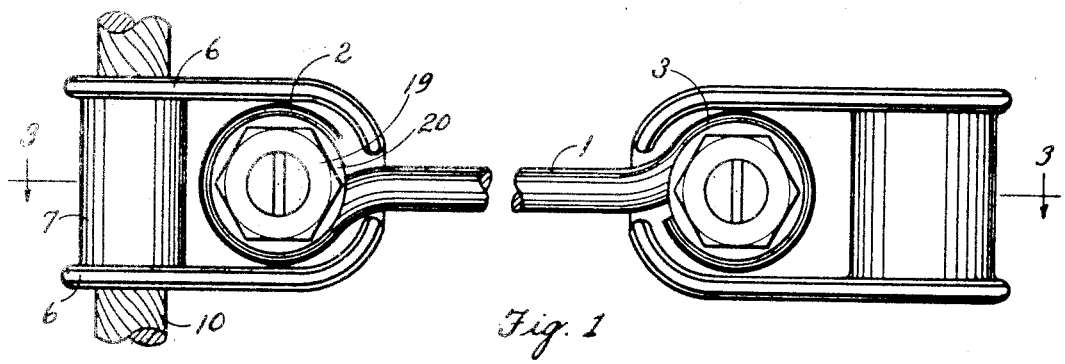
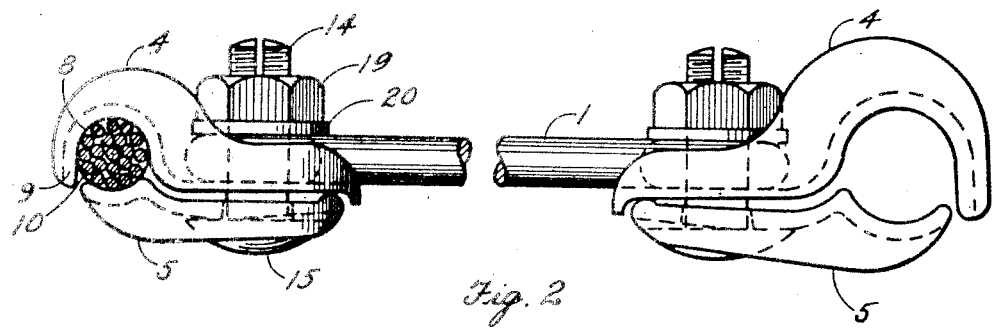
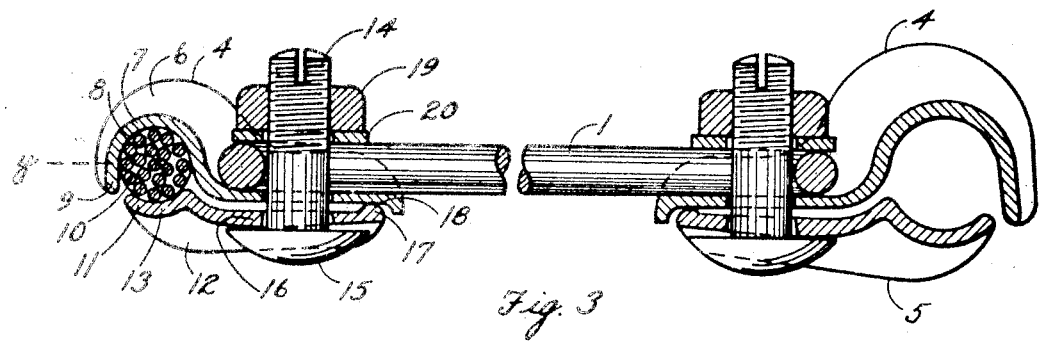

1,702,124

UNITED STATES PATENT OFFICE.

SAMUEL S. MATTHES, OF MANSFIELD, OHIO, ASSIGNOR TO THE OHIO BRASS COMPANY, OF MANSFIELD, OHIO, A CORPORATION OF NEW JERSEY.

CONDUCTOR SUPPORT.

Application filed July 1, 1925. Serial No. 40,814.

My invention relates to a hanger for connecting two conductors together and particularly to that class of construction known as catenary construction used in the suspension of a trolley conductor from an overhead cable.

The objects of my invention are to provide a hanger which can be produced at a low cost and which is simple to install and which will require no maintenance expense; to provide a device which will electrically and mechanically connect two conductors together, both of which may be suspension cables or one of which may be a trolley conductor; to provide a hanger which has few parts and which can be assembled and disassembled from the conductors without the necessity of entirely disassembling the hanger as a whole; and further to provide a hanger which, when loosely connected to one of the cables or conductors, may be easily moved along the cable into proper position. Other objects will be disclosed as the description and operation of my invention is further disclosed hereinafter.

In the drawing accompanying this specification:

Fig. 1 is a side view of my invention shown as gripping one conductor having similar means at the opposite end for gripping another conductor. One or the other of the gripping means may be so changed as to grip a trolley wire conductor in such a manner as not to offer interference to the passage of the trolley collector thereunder when in contact with the trolley wire.

Fig. 2 is an edgewise view of Fig. 1.

Fig. 3 is a view in partial section of Fig. 1 on the line 3—3.

In the preferred embodiment of my invention I employ a support rod 1 which is provided with an eye member at each end 2 and 3 respectively, which are formed out of the ends of the member 1 by bending the same into a loop leaving an opening in the center to receive a fastening bolt.

To the ends of the member 1 are secured clamping members each comprising a body member 4 and a clamping member 5. The body member 4 comprises a pair of spaced ribs 6 connected by an intermediate member 7 which is shaped to form a groove 8 and an extension portion 9 which projects beyond the line Y which is the line passing through the axes of the conductor 10. This prevents the members 4 and 5 forming an opening at some point coinciding with the line Y, as would be the case if the members 4 and 5 were made substantial duplicates so far as the gripping ends are concerned and it is this overhanging portion 9 which permits the hanger to slide easily along a supporting conductor when the member 5 has been loosened up so that the two members 4 and 5 do not tightly grip the conductor 10. The clamping member 5 is provided with a groove 11 which coacts with the groove 8 to receive and grip the conductor 10 and the clamping member 5 comprises spaced ribs 12 connected by the intermediate member 13.

The intermediate members 7 and 13 are provided with extensions through which are registering orifices to receive the threaded shank 14 of the bolt 15. The head of the bolt 15 engages the extension portion 16 of the intermediate member 13 which is so constructed that its surfaces curve relative to that of the bolt head so that the contact between the clamping member and bolt 15 is more of a line contact than a surface contact which permits the easier adjustment of the clamping members and bolt with respect to each other when placed in clamping engagement with the conductor. The member 16 is provided with a transverse bead 17 which engages the portion 18 of the member 4 and this construction permits the clamping member 5 to freely adjust itself relative to the member 4 when gripping the cable 10 and permits of gripping various sizes of cables within reasonable limits. The construction of the parts 4 and 5 are such and the length of the threaded shank 14 such that it is possible to introduce the cable 10 between the clamping members 4 and 5 without entirely removing the nut 19 from the stud 14 thereby making it unnecessary to entirely disassemble the parts when installing.

The parts 1, 4 and 5 are assembled as shown and the bolt 15 positioned in place and the washer 20 applied, and then the nut 19 is positioned on the threaded stud 14 and this operation is carried out with the clamping members 4 and 5 at both ends. I find that a construction of the clamping members 4 and 5 as described produces a device which has a maximum strength for a minimum weight, as it will be noted that the intermediate sections 7 and 13 are very light and the ribs 6 and 12 are very narrow, but deep and extend back to the extreme opposite end of the members 4 and 5 from the grooves 8 and 11. The construction is such that it grips the cables in each pair of jaws securely and the bolt 15 and nut 19 hold the parts in secure engagement with each other and offer not only a high efficient mechanical connector for the cables, but also a very efficient electrical connector.

There will be variations which will suggest themselves to those skilled in the art, therefore, I do not wish to be limited other than by my claims.

I claim:

1. A support for a cable comprising a rod having an eye at one end thereof, a pair of clamping members each having an eye therethrough disposed in registration with the eye in said supporting rod, a bolt extending through said eyes and having a nut thereon for clamping said supporting rod and clamping members together, one of said clamping members having a hooked portion extending beyond the end of said supporting rod and provided with a recess open at one side of said clamping member and extending transversely to the direction of the axis of said supporting rod, the other of said clamping members having a holding portion disposed in registration with the open side of said recess, the major portion of the recess enclosed by said hooked member and holding member being disposed within said hooked member and having its axis substantially in the plane of the axis of said supporting rod.

2. A support for a cable comprising a clamping member having a web portion provided with reinforcing ribs at the edges thereof, said web portion being curved laterally to provide a hook open at the side opposite said reinforcing ribs, a second clamping member having a web portion provided with reinforcing ribs at the edges thereof, the web portion of said second clamping member being disposed adjacent the web portion of said first clamping member and having a portion thereof disposed adjacent the opening at the side of the recess in said first clamping member to close said opening, the major portion of said opening being formed by the recess in said first clamping member, registering eyes extending through the web portions of said clamping members, a bolt extending through said eyes, a fulcrum member on one of said clamping members for engaging the other of said clamping members, a nut on said bolt to swing said clamping members about said fulcrum, and a supporting rod secured to said clamping member and extending substantially normal to the axis of the opening enclosed by said clamping members.

3. A support for a cable comprising a pair of clamping members, a bolt extending through said clamping members between the ends thereof for drawing said clamping members together, a fulcrum for said clamping members at one side of said bolt, one of said clamping members having a recess therein at the side of said bolt opposite said fulcrum open at the side thereof adjacent the other of said clamping members, which other clamping member constitutes a closure for the open side of said recess, the major portion of the opening enclosed by said clamping members being disposed within the recess in said first-mentioned clamping member, and a supporting rod having an eye therein surrounding said bolt and extending normal to the axis of the opening enclosed by said clamping members, the axis of said opening and the axis of said supporting rod being disposed substantially in a common plane.

4. A support for a cable comprising a pair of clamping members each having a web portion provided with ribs at the edges thereof, a bolt extending through said web portions between the ends of said clamping members, a fulcrum for said clamping members at one side of said bolt, a recess formed in one of said clamping members at the side of said bolt opposite said fulcrum, said recess being open at one side, the other of said clamping members having a portion disposed adjacent the open side of said recess for closing said recess, a supporting rod having an eye formed in the end thereof and surrounding said bolt, said eye being disposed between the ribs of said recessed clamping member with the axis of said rod substantially in the plane of the axis of the opening enclosed by said clamping members, and a nut for holding said rod to said clamping members and for swinging said clamping members about said fulcrum to cause said clamping members to grip a cable disposed in the opening enclosed thereby.

5. A support for a cable comprising a pair of clamping members having gripping portions for holding a cable, and having pivotal contact with each other at a point spaced from said gripping portions, a supporting rod for said clamping members, and a single bolt extending through said supporting rod and clamping members at a point between said pivotal contact and said gripping portions and serving to connect said clamping members to said supporting rod and to draw the gripping portions of said clamping members against a cable held therebetween, said supporting rod when connected with said clamping members by said bolt being disposed with the axis thereof substantially normal to the axis of the cable held by said clamping members.

6. A support for a cable comprising a pair of clamping members each having a web portion provided at its opposite edges with reinforcing ribs, a bolt passing through said web portions between the ends of said clamping members, a fulcrum member for said clamping members at one side of said bolt, one of said clamping members having a hook at the opposite side of said bolt from said fulcrum, the opening in said hook being greater than a semi-circle and forming a recess open at one side thereof, the other of said clamping members having a portion registering with the open side of said recess for closing said recess, said last-named clamping member having a curved face for engaging the head of said bolt, a supporting rod having an eye formed on the end thereof disposed about said bolt between the ribs of said hooked clamping member, a nut for holding said clamping members and supporting rod together and for tightening said clamping members upon a cable disposed in the recess of said hook, and a pair of clamping members connected with the opposite end of said rod and having means for gripping a cable disposed parallel with the cable held by said first-named pair of clamping members.

In testimony whereof I affix my signature.

SAMUEL S. MATTHES.